United States Patent
Zhou et al.

(10) Patent No.: US 12,550,014 B2
(45) Date of Patent: Feb. 10, 2026

(54) DUAL-CONNECTIVITY HANDOVER METHOD, HANDOVER DEVICE AND STORAGE MEDIUM

(71) Applicant: DATANG MOBILE COMMUNICATIONS EQUIPMENT CO., LTD., Beijing (CN)

(72) Inventors: Ye Zhou, Beijing (CN); Aijuan Liu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 390 days.

(21) Appl. No.: 17/791,071

(22) PCT Filed: Dec. 8, 2020

(86) PCT No.: PCT/CN2020/134699
§ 371 (c)(1),
(2) Date: Jul. 6, 2022

(87) PCT Pub. No.: WO2021/139464
PCT Pub. Date: Jul. 15, 2021

(65) Prior Publication Data
US 2023/0063126 A1   Mar. 2, 2023

(30) Foreign Application Priority Data
Jan. 9, 2020  (CN) .......................... 202010021626.6

(51) Int. Cl.
*H04W 36/00* (2009.01)
(52) U.S. Cl.
CPC ... *H04W 36/0061* (2013.01); *H04W 36/0022* (2013.01); *H04W 36/0069* (2018.08)

(58) Field of Classification Search
CPC ........ H04W 36/0022; H04W 36/0061; H04W 36/0069
See application file for complete search history.

(56) References Cited

U.S. PATENT DOCUMENTS

| 2015/0264621 A1* | 9/2015 | Sivanesan | H04W 36/302 455/436 |
| 2017/0111841 A1 | 4/2017 | Henttonen et al. | |

(Continued)

FOREIGN PATENT DOCUMENTS

| CN | 105848222 A | 8/2016 |
| CN | 105981442 A | 9/2016 |

(Continued)

OTHER PUBLICATIONS

Ericsson et al., RAN UE ID, 3GPP TSG-RAN WG3 #106, R3-197078, Nov. 18-22, 2019.

(Continued)

*Primary Examiner* — Benjamin H Elliott, IV
*Assistant Examiner* — Tracy Lauren Raimondo
(74) *Attorney, Agent, or Firm* — Meunier Carlin & Curfman LLC

(57) ABSTRACT

A dual-connectivity handover method, a handover device and a storage medium. The target dual connectivity further comprises a target secondary node. A user terminal communicates with a source node before accessing the target dual connectivity. The method comprises: receiving handover request information, wherein the handover request information carries first information, and the first information is configuration information of the source node for the user terminal, or an index of the configuration information; and sending a first interface message to the target secondary node, wherein the first interface message carries the first (Continued)

information for enabling the target secondary node configure the user terminal according to the first information.

18 Claims, 7 Drawing Sheets

(56) References Cited

U.S. PATENT DOCUMENTS

| | | | | |
|---|---|---|---|---|
| 2017/0325143 | A1* | 11/2017 | Dai | H04W 36/08 |
| 2018/0014237 | A1 | 1/2018 | Xu et al. | |
| 2020/0205042 | A1* | 6/2020 | Ryu | H04W 36/08 |
| 2021/0211952 | A1* | 7/2021 | Teyeb | H04W 36/305 |
| 2021/0385897 | A1* | 12/2021 | Purkayastha | H04W 36/087 |
| 2022/0330106 | A1* | 10/2022 | Awada | H04W 36/00698 |

FOREIGN PATENT DOCUMENTS

| | | |
|---|---|---|
| EP | 4145903 A1 | 8/2023 |
| WO | 2018225016 A1 | 12/2018 |
| WO | WO-2019039672 A1 * 2/2019 ............ H04W 36/00 |

OTHER PUBLICATIONS

Huawei, HiSilicon, CR on 37.340 for supporting the handover from NR to EN-DC, 3GPP TSG-RAN WG2 Meeting#104, R2-1817363, Nov. 12-16, 2018.
CATT, CR on Handover Decision in EN-DC scenario, 3GPP TSG-RAN WG3 Meeting #105-Bis, R3-195315, Oct. 14-18, 2019.
Ericsson, Support of handover between NR and EN-DC, 3GPP TSG-RAN WG2#106, R2-1906130, May 13-17, 2019.
ZTE, Correction of indicator in DC handover enhancement, 3GPP TSG-RAN WG3 Meeting #90, R3-152613, Nov. 16-20, 2015.
3GPP TSG-RAN WG2 Meeting #104, R2-1819036, Spokane, USA Nov. 12-16, 2018.
3GPP TSG-RAN WG3 Meeting #95bis, R3-171152, Spokane, USA Apr. 3-7, 2017.

* cited by examiner

DUAL-CONNECTIVITY HANDOVER METHOD, HANDOVER DEVICE AND STORAGE MEDIUM

CROSS REFERENCE TO RELATED APPLICATIONS

The application is a National Stage of International Application No. PCT/CN2020/134699, filed on Dec. 8, 2020, which claims priority to Chinese Patent Application No. 202010021626.6 filed to China National Intellectual Property Administration on Jan. 9, 2020.

FIELD

The disclosure relates to the field of mobile communication, in particular to a dual-connectivity handover method, a dual-connectivity handover device and a storage medium.

BACKGROUND

With the continuous development of mobile communication technology, in order to meet the needs of different users, mobile operators usually need to operate multiple communication systems simultaneously, e.g., four systems of the 2-Generation (2G) wireless telephone technology, the 3rd-Generation (3G) mobile network, the fourth generation (4G) mobile network, and the fifth generation (5G) mobile network are operated simultaneously.

Moreover, the services supported by different systems of the same operator may also be different. For example, operators set the voice service, which requires low latency and high service continuity, is relatively complex in connection with the backbone network, but is low in bandwidth demand, on relatively old systems (such as 4G) which are sufficiently mature and have relatively stable channels, while they set the service requiring a large bandwidth on relatively new systems (such as 5G).

The deployment brings a scenario: a terminal is using a newer system to transmit the large bandwidth service, but at a time point it needs to establish the voice service, so the network has to switch it to an older system. In order to ensure the quality of service (QoS) indicator of the original service, the older system may choose to configure dual connectivity for the terminal, so that on one hand, the terminal may perform voice calls by using the older radio access network node (i.e. the target master node) in the older system, and on the other hand, the terminal may also perform data transmission by using the newer radio access network node (i.e. the target secondary node) in the older system. The target secondary node may be the same physical entity as the radio access network node (i.e. the target master node) accessed before the handover.

However, in the related art, a radio access network node may manage thousands of terminals at the same time. Even if the above handover occurs, the radio access network node, as the entity of the target secondary node, neither can determine whether the accessed terminal is the terminal it originally served, nor can recognize which accessed terminal is the terminal it originally served, so it has to reconfigure the low layer resources, resulting in poor service continuity for the terminal.

In view of this, how to effectively improve the service continuity provided for the terminal has become an urgent technical problem to be solved.

SUMMARY

The disclosure provides a dual-connectivity handover method, a dual-connectivity handover device, and a storage medium to solve the technical problem of poor service continuity provided for a terminal existing in the related art.

In a first aspect, to address the above technical problem, embodiments of the disclosure provide a dual-connectivity handover method, performed by a target master node of target dual connectivity. The target dual connectivity further includes a target secondary node, a user terminal communicates with a source node before accessing the target dual connectivity, and the technical solution of the method including: receiving handover request information, wherein the handover request information carries first information, and the first information is configuration information of the source node for the user terminal, or an index of configuration information of the source node for the user terminal; and sending a first interface message to the target secondary node, wherein the first interface message carries the first information for enabling the target secondary node to configure the user terminal according to the first information.

Optionally, the index of the configuration information is an identifier of the user terminal at the source node.

Optionally, the identifier includes: a terminal identifier between the source node and a core network and applicable of the source node; or a Cell Radio Network Temporary identifier (C-RNTI); or a newly defined identifier, wherein the newly defined identifier is an identifier that the target secondary node is able to index the configuration information of the source node.

Optionally, the source node is a single connectivity node or a master node in source dual connectivity.

In a second aspect, embodiments of the disclosure provide a dual-connectivity handover method, performed by a target secondary node of target dual connectivity, wherein the target dual connectivity further includes a target master node, a user terminal communicates with a source node before accessing the target dual connectivity, and the method includes: receiving a first interface message sent by the target master node; wherein the first interface message carries first information for enabling the target secondary node to configure the user terminal according to the first information, and the first information is configuration information of the source node for the user terminal, or an index of configuration information of the source node for the user terminal.

Optionally, the index of the configuration information is an identifier of the user terminal at the source node.

Optionally, the identifier includes: a terminal identifier between the source node and a core network and applicable of the source node; or a C-RNTI; or a newly defined identifier, wherein the newly defined identifier is an identifier that the target secondary node is able to index the configuration information of the source node.

Optionally, the source node is a single connectivity node or a master node in source dual connectivity.

In a third aspect, embodiments of the disclosure also provide a dual-connectivity handover method, performed by a source node, the source node is connected with a user terminal, and the method includes: sending handover request information to a core network; wherein the handover request information is configured to request to handover the user terminal to a target master node, so as to enable the target master node, upon determining that target dual connectivity is configured for the user terminal, to send a first interface message to a target secondary node of the target dual connectivity; the handover request information carries first information; and the first interface message carries the first information for enabling the target secondary node to configure the user terminal according to the first information, and the first information is configuration information of the source node for the user terminal, or an index of configuration information of the source node for the user terminal.

Optionally, the index of the configuration information is an identifier of the user terminal at the source node.

Optionally, the identifier includes: a terminal identifier between the source node and the core network and applicable of the source node; or a C-RNTI; or a newly defined identifier, wherein the newly defined identifier is an identifier that the target secondary node is able to index the configuration information of the source node.

Optionally, the source node is a single connectivity node or a master node in source dual connectivity.

In a fourth aspect, embodiments of the disclosure also provide a dual-connectivity handover device, performed by a target master node of target dual connectivity, wherein the target dual connectivity further includes a target secondary node, a user terminal communicates with a source node before accessing the target dual connectivity, and the handover device includes: a processor, a memory, and a transceiver. The processor is configured to read the program in the memory and perform the following: receiving handover request information; wherein the handover request information carries first information, and the first information is configuration information of the source node for the user terminal, or an index of configuration information of the source node for the user terminal; and sending a first interface message to the target secondary node, wherein the first interface message carries the first information for enabling the target secondary node to configure the user terminal according to the first information.

Optionally, the index of the configuration information is an identifier of the user terminal at the source node.

Optionally, the identifier includes: a terminal identifier between the source node and a core network and applicable of the source node; or a C-RNTI; or a newly defined identifier, wherein the newly defined identifier is an identifier that the target secondary node is able to index the configuration information of the source node.

Optionally, the source node is a single connectivity node or a master node in source dual connectivity.

In a fifth aspect, embodiments of the disclosure also provide a dual-connectivity handover device in a target secondary node of target dual connectivity, wherein the target dual connectivity further includes a target master node, a user terminal communicates with a source node before accessing the target dual connectivity, and the handover device includes: a processor, a memory, and a transceiver. The processor is configured to read the program in the memory and perform the following: receiving a first interface message sent by the target master node; wherein the first interface message carries the first information for enabling the target secondary node to configure the user terminal according to the first information, and the first information is configuration information of the source node for the user terminal, or an index of configuration information of the source node for the user terminal.

Optionally, the index of the configuration information is an identifier of the user terminal at the source node.

Optionally, the identifier includes: a terminal identifier between the source node and a core network and applicable of the source node; or a C-RNTI; or a newly defined identifier, wherein the newly defined identifier is an identifier that the target secondary node is able to index the configuration information of the source node.

Optionally, the source node is a single connectivity node or a master node in source dual connectivity.

In a sixth aspect, embodiments of the disclosure also provide a dual-connectivity handover device in a source node, wherein the source node is connected with a user terminal, and the handover device includes: a processor, a memory, and a transceiver. The processor is configured to read the program in the memory and perform the following: sending handover request information to a core network; wherein the handover request information is configured to request to handover the user terminal to a target master node, so as to enable the target master node, upon determining that target dual connectivity is configured for the user terminal, to send a first interface message to a target secondary node of the target dual connectivity; the handover request information carries first information; and the first interface message carries the first information for enabling the target secondary node to configure the user terminal according to the first information, and the first information is configuration information of the source node for the user terminal, or an index of configuration information of the source node for the user terminal.

Optionally, the index of the configuration information is an identifier of the user terminal at the source node.

Optionally, the identifier includes: a terminal identifier between the source node and a core network and applicable of the source node; or a C-RNTI; or a newly defined identifier, wherein the newly defined identifier is an identifier that the target secondary node is able to index the configuration information of the source node.

Optionally, the source node is a single connectivity node or a master node in source dual connectivity.

In a seventh aspect, embodiments of the disclosure also provide a dual-connectivity handover device in a target master node of target dual connectivity, wherein the target dual connectivity further includes a target secondary node, a user terminal communicating with a source node before accessing the target dual connectivity, and the device includes: a receiving unit, configured to receive handover request information; wherein the handover request information carries first information, and the first information is configuration information of the source node for the user terminal, or an index of configuration information of the source node for the user terminal; and a sending unit, configured to send a first interface message to the target secondary node, wherein the first interface message carries the first information for enabling the target secondary node to configure the user terminal according to the first information.

Optionally, the index of the configuration information is an identifier of the user terminal at the source node.

Optionally, the identifier includes: a terminal identifier between the source node and a core network and applicable of the source node; or a C-RNTI; or a newly defined identifier, wherein the newly defined identifier is an identifier that the target secondary node is able to index the configuration information of the source node.

Optionally, the source node is a single connectivity node or a master node in source dual connectivity.

In an eighth aspect, embodiments of the disclosure also provide a dual-connectivity handover device in a target secondary node of target dual connectivity, wherein the target dual connectivity further includes a target master node, a user terminal communicates with a source node before accessing the target dual connectivity, and the handover device includes: a receiving unit, configured to receive a first interface message sent by the target master node; wherein the first interface message carries first information for enabling the target secondary node to configure the user terminal according to the first information, and the first information is configuration information of the source node for the user terminal, or an index of configuration information of the source node for the user terminal.

Optionally, the index of the configuration information is an identifier of the user terminal at the source node.

Optionally, the identifier includes: a terminal identifier between the source node and a core network and applicable of the source node; or a C-RNTI; or a newly defined identifier, wherein the newly defined identifier is an identifier that the target secondary node is able to index the configuration information of the source node.

Optionally, the source node is a single connectivity node or a master node in source dual connectivity.

In a ninth aspect, embodiments of the disclosure also provide a dual-connectivity handover device in a source node, the source node being connected with a user terminal, wherein the handover device includes: a sending unit, configured to send handover request information to a core network; wherein the handover request information is configured to request to handover the user terminal to a target master node, so as to enable the target master node, upon determining that target dual connectivity is configured for the user terminal, to send a first interface message to a target secondary node of the target dual connectivity; the handover request information carries first information; and the first interface message carries the first information for enabling the target secondary node to configure the user terminal according to the first information, and the first information is configuration information of the source node for the user terminal, or an index of configuration information of the source node for the user terminal.

Optionally, the index of the configuration information is an identifier of the user terminal at the source node.

Optionally, the identifier includes: a terminal identifier between the source node and a core network and applicable of the source node; or a C-RNTI; or a newly defined identifier, wherein the newly defined identifier is an identifier that the target secondary node is able to index the configuration information of the source node.

Optionally, the source node is a single connectivity node or a master node in source dual connectivity.

In a tenth aspect, embodiments of the disclosure also provide a processor-readable storage medium including: the processor-readable storage medium stores a program which, when run on a processor, causes the processor to execute the method according to the first, second or third aspect described above.

Through the technical solutions in one or more of the above embodiments of the embodiments of the disclosure, the embodiments of the disclosure have at least the following technical effects.

In the embodiments provided by the disclosure, when the target master node in the target dual connectivity receives the handover request information for handover, it sends the first information carried in the handover request information to the target secondary node through the first interface message. Because the first information is the configuration information of the source node for the user terminal, or the index of the configuration information, the target secondary node may configure the user terminal according to the first information, so that the user terminal uses the same configuration at the target secondary node and the source node to maintain the same quality of service obtained by the user terminal at the target secondary node and the source node, so as to provide better service continuity for the user terminal.

DETAILED DESCRIPTION OF THE EMBODIMENTS

Figure 1:
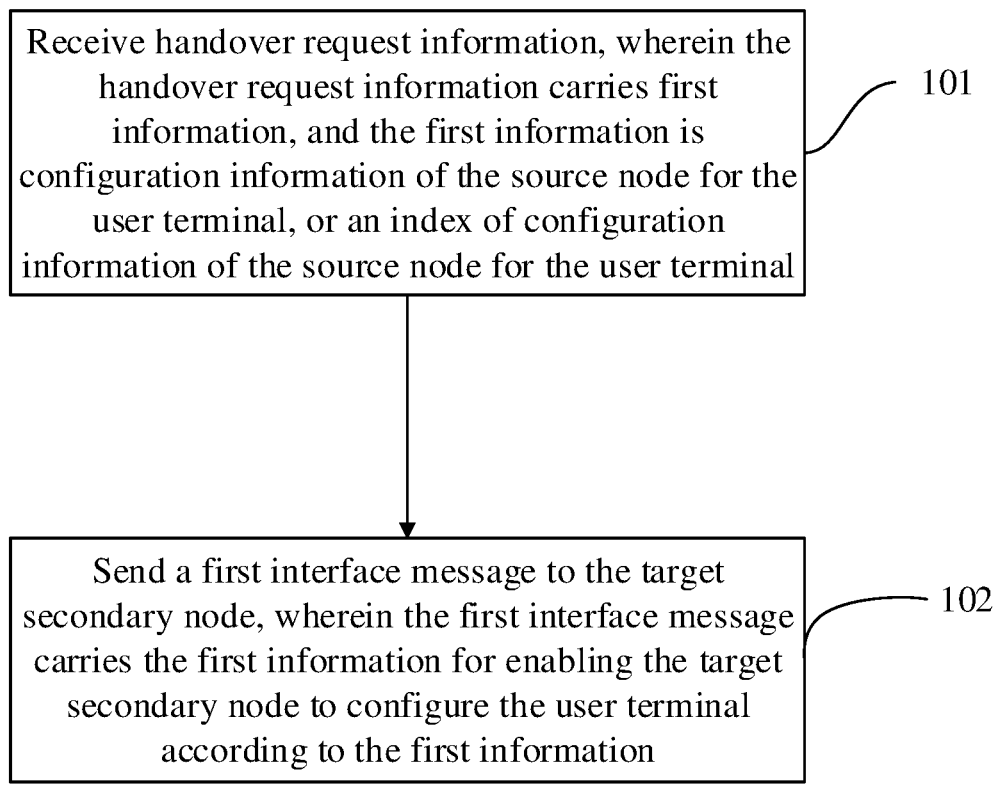
FIG. 1 is a flow diagram of a dual-connectivity handover method performed by a target master node according to an embodiment of the disclosure.

Embodiments of the disclosure provide a dual-connectivity handover method, a dual-connectivity handover device, and a storage medium to solve the technical problem of poor service continuity provided for a terminal in the related art.

The technical solution in the embodiments of the present application is to solve the technical problem described above and the general idea is as follows.

There is provided a dual-connectivity handover method performed by a target master node of target dual connectivity. The target dual connectivity further includes a target secondary node. A user terminal communicates with a source node before accessing the target dual connectivity. The method includes: receiving handover request information, wherein the handover request information carries first information, and the first information is configuration information of the source node for the user terminal, or an index of configuration information of the source node for the user terminal; and sending a first interface message to the target secondary node, wherein the first interface message carries the first information for enabling the target secondary node to configure the user terminal according to the first information.

In the above solution, when the target master node in the target dual connectivity receives the handover request information for handover, it sends the first information carried in the handover request information to the target secondary node through the first interface message. Because the first information is the configuration information of the source node for the user terminal, or the index of the configuration information, the target secondary node may configure the user terminal according to the first information, so that the user terminal uses the same configuration at the target secondary node and the source node to maintain the same quality of service obtained by the user terminal at the target secondary node and the source node, so as to provide better service continuity for the user terminal.

In order to better understand the above technical solution, before making a detailed description of the technical solution of the disclosure through the attached drawings and specific embodiments, a brief introduction is made to some concepts related to the technical solution of the disclosure and the process of the inventor discovering the problem.

The mobile communication system may usually be divided into three parts: a user terminal, a radio access network and a core network. The core network is usually provided with a kind of mobility management network elements, such as the mobility management entity (MME) in the long term evolution (LTE) system and the access and mobility management function (AMF) in the 5G system.

In the actual operation of the mobile network, because the newer network does not support a certain service, the newer network has to return an unsupported service to the old system supporting the service when a user terminal connected to the newer network wants to launch the unsupported service.

In order to better ensure the service continuity, the operator may consider directly switching to the dual-connectivity mode when initiating the fallback triggered by the service. The determination is executed by the master node (MN) in the dual connectivity (DC). Dual connectivity refers to the working mode that the same user terminal communicates with the core network through multiple radio access network nodes simultaneously. In the simplest dual-connectivity mode, the user terminal is connected to a master node and a secondary node (SN).

When the core network is the core network, i.e., the evolved packet core (EPC), of the LTE system, the master node of dual connectivity must be the evolved Node B (eNB), and its air interface technology is evolved universal terrestrial radio access (E-UTRA). Correspondingly, its secondary node may be either a node using the E-UTRA technology or a node using the new radio (NR) technology. If the secondary node is a node using the E-UTRA technology, the dual connectivity is called LTE DC; if the secondary node is a node using the NR technology, the dual connectivity is called E-UTRA-NR Dual Connectivity (EN-DC). The radio access network node that uses the NR technology and may work in the EN-DC mode as a secondary node is called en-gNB.

When the core network is a 5G core (5GC) network, the user terminal may access the network through the E-UTRA technology or the NR technology. The E-UTRA node connected to the 5G core network is called ng-eNB, while the NR node connected to the 5G core network is called gNB. The ng-eNB and gNB are collectively referred to as NG-RAN node. The user terminal may also access the network through the dual-connectivity mode. The dual connectivity with the master node being ng-eNB and the secondary node being gNB is called NGEN-DC (NG-RAN E-UTRA-NR Dual Connectivity). The dual connectivity with the master node being gNB and the secondary node being ng-eNB is called NE-DC (NR-E-UTRA Dual Connectivity), and the dual connectivity with both the master node and the secondary node being gNB is called NR-DC (NR-NR Dual Connectivity). The NR technology is more advanced than the E-UTRA technology and may support a larger bandwidth.

For example, the operator may only support the voice service in eNB and ng-eNB, while gNB does not support the voice service. If a terminal connected to the 5G core network through gNB by using the larger bandwidth of the NR technology needs to establish the voice service, the network may hand over the terminal to the NGEN-DC mode, the voice service is transmitted through ng-eNB, and other services are still transmitted through gNB by using the larger bandwidth of the NR technology. Usually, the gNB that acts as the secondary node after the handover is the same node as the gNB before the handover.

In the fallback process, when it comes to the handover process of change of the mobility management network element of the core network, the inventor finds that in the related art, the interface message of the target master node requesting to add the target secondary node (including but not limited to a "secondary node addition request" message and a "SgNB (Secondary en-gNB) addition request" message) does not contain any configuration information of the user terminal at the source node or the source master node, and also does not contain any user identity information related to the source node or the source master node of the user terminal. Therefore, when the target secondary node receives the interface message requesting to add a secondary node, in order to balance the load as much as possible and avoid unnecessary conflicts and congestion, the resource configured for the newly accessed user terminal will avoid the resources configured for other user terminals that are in service. This makes that, during the handover preparation process, because the source node (or source master node) is still serving the user terminal that has handed over, the low layer resource allocated to the user terminal by the source node (or source master node) as the target secondary node is often significantly different from the low layer resource allocated to the user terminal by the source node (or source master node) as the source node (or source master node), resulting in poor configuration continuity for the user terminal, and thus poor service continuity for the user terminal.

In order to solve the problem, the inventor proposes the following solution.

The following is a detailed description of the technical solution of the disclosure through the attached drawings and specific embodiments. It should be understood that the embodiments of the disclosure and the specific features in the embodiments are a detailed description of the technical solution of the disclosure, rather than a limitation of the technical solution of the disclosure. Without conflicts, the embodiments of the disclosure and the technical features in the embodiments can be combined with each other.

Referring to FIG. 1, an embodiment of the disclosure provides a dual-connectivity handover method, performed by a target master node of target dual connectivity, wherein the target dual connectivity further includes a target secondary node, the user terminal communicates with a source node before accessing the target dual connectivity, and the method includes the following processes.

Step 101: handover request information is received, wherein the handover request information at least carries first information.

The first information is configuration information of the source node for the user terminal, or an index of configuration information of the source node for the user terminal.

The handover request information may be received from the core network corresponding to the target master node.

In embodiments provided herein, the source node is a single connectivity node, or a master node in source dual connectivity. For example, when the user terminal is in single connectivity with the source node, the source node is a single connectivity node; when a user terminal is handed over from one dual connectivity (e.g., source dual connectivity) to another dual connectivity (e.g., target dual connectivity), the source node is the master node in the source dual connectivity. Usually, one dual connectivity is different from another dual connectivity since they have different master and secondary nodes to form the dual connectivity.

Configuration information of the source secondary node for the user terminal, or an index of configuration information of the source secondary node for the user terminal may also carried in the handover request information when the user terminal is handed over from the source dual connectivity to the target dual connectivity, and the source secondary node and the source node forms the source dual connectivity.

The type of service used by the user terminal in the source node and/or the source secondary node, occupied resource situation, etc., may also be carried in the handover request information, which may facilitate that the target master node reasonably configures a resource for the user terminal, or selects an applicable target secondary node to provide partial services for the user terminal.

In an embodiment provided herein, the source node and the target master node may be located in the same core network or may be located in different core networks. In the process of handing over a user terminal from a source node to a target master node, a change of a mobility management network element of the core network is involved.

The first information reaches a mobility management network element corresponding to the source node via the source node, then reaches a mobility management network element corresponding to the target master node via the mobility management network element corresponding to the source node, and finally reaches the target master node by the mobility management network element corresponding to the target master node.

In an embodiment provided herein, the index of the configuration information is the identifier of the user terminal at the source node.

In an embodiment provided herein, the identifier includes: a terminal identifier between the source node and a core network and applicable of the source node; or a Cell Radio Network Temporary identifier (C-RNTI); or a newly defined identifier, wherein the newly defined identifier is an identifier that the target secondary node is able to index the configuration information of the source node.

Step 102: a first interface message is sent to the target secondary node; wherein the first interface message carries the first information for enabling the target secondary node to configure the user terminal according to the first information.

When the target master node determines to configure target dual connectivity for the user terminal, a first interface message carrying the first information is sent to the target secondary node to cause the target secondary node to configure the user terminal according to the first information, such that the low layer resource allocated for the user terminal by the target secondary node is the same as that allocated by the source node, thus improving the configuration continuity and the service continuity.

After the working process of the target master node in the target dual connectivity is introduced, the working process is then introduced from the target secondary node in the target dual connectivity.

Based on the same inventive concept, in an embodiment of the disclosure there is provided a dual-connectivity handover method, performed by a target secondary node of target dual connectivity, wherein the target dual connectivity further includes a target master node, a user terminal communicates with a source node before accessing the target dual connectivity, and the method includes receiving a first interface message sent by the target master node.

The first interface message carries the first information configured for enabling the target secondary node to configure the user terminal according to the first information, and the first information is configuration information of the source node for the user terminal, or an index of configuration information of the source node for the user terminal.

In an embodiment provided herein, the index of the configuration information is the identifier of the user terminal at the source node.

In an embodiment provided herein, the identifier of the user terminal at the source node includes: a terminal identifier between the source node and a core network and applicable of the source node; or a C-RNTI; or a newly defined identifier, wherein the newly defined identifier is an identifier that the target secondary node is able to index the configuration information of the source node.

In an embodiment provided herein, the source node is a single connectivity node, or a master node in source dual connectivity.

In an embodiment provided herein, the target secondary node may or may not be the source node. The target secondary node is the source node when the target master node determines the source node as the target secondary node. The target secondary node is not the source node when the target master node determines other node than the source node as the target secondary node.

After the working processes of the target master node and the target secondary node in the target dual connectivity have been introduced, the working process is described below from the source node.

Based on the same inventive concept, in an embodiment of the disclosure there is provided a dual-connectivity handover method performed by a source node, the source node being connected with a user terminal, the handover method includes: sending handover request information to a core network.

The handover request information is configured to request to handover the user terminal to a target master node so as to enable the target master node, upon determining that target dual connectivity is configured for the user terminal, to send a first interface message to a target secondary node of the target dual connectivity; the handover request information carries first information; and the first interface message carries the first information for enabling the target secondary node to configure the user terminal according to the first information, and the first information is configuration information of the source node for the user terminal, or an index of configuration information of the source node for the user terminal.

In an embodiment provided herein, the source node is a single connectivity node, or a master node in source dual connectivity. For example, when the user terminal is in single connectivity with the source node, the source node is a single connectivity node, and when the source node configures dual connectivity for the user terminal, the source node is a master node in source dual connectivity.

Configuration information of the source secondary node for the user terminal, or an index of configuration information of the source secondary node for the user terminal may also carried in the handover request information when the user terminal is handed over from the source dual connectivity to the target dual connectivity, and the source secondary node and the source node forms the source dual connectivity.

The type of service used by the user terminal in the source node and/or the source secondary node, occupied resource situation, etc. may also be carried in the handover request information, which may facilitate that the target master node reasonably configures a resource for the user terminal, or selects an applicable target secondary node to provide partial services for the user terminal.

In an embodiment provided herein, the source node and the target master node may be located in the same core network or may be located in different core networks.

During handover of the user terminal from the source node to the target master node, a change of the mobility management network element of the core network is involved, in the LTE system, the mobility management network element is the MME and in the 5G system, the mobility management network element is the AMF.

For example, when the user terminal requests the voice service from the source node, the source node determines that it does not support the voice service, e.g., the source node is a high frequency base station, and the source node sends a handover request message carrying the first information to its corresponding core network, and the handover request message is processed by the mobility management network element in the core network.

The first information reaches a mobility management network element corresponding to the source node via the source node, then reaches a mobility management network element corresponding to the target master node via the mobility management network element corresponding to the source node, and finally reaches the target master node via the mobility management network element corresponding to the target master node, so as to request to handover the user terminal to the target master node.

In an embodiment provided herein, the index of the configuration information is the identifier of the user terminal at the source node.

In an embodiment provided herein, the identifier of the user terminal at the source node includes: a terminal identifier between the source node and the core network and applicable of the source node; or a C-RNTI; or a newly defined identifier, wherein the newly defined identifier is an identifier that the target secondary node is able to index the configuration information of the source node.

In order for a person skilled in the art to fully understand the solution, the following embodiments are provided according to different scenarios.

Figure 2:
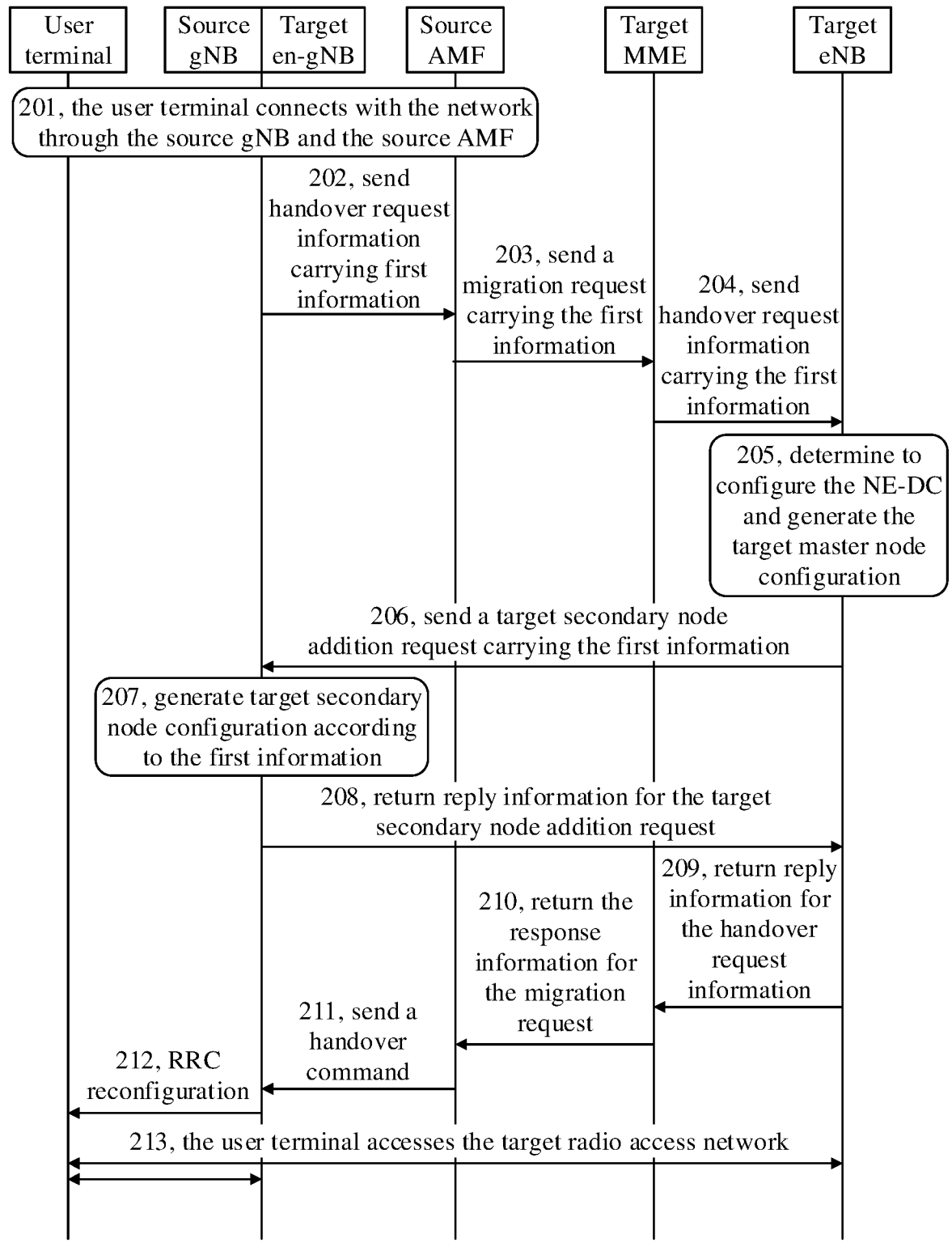
FIG. 2 is a first schematic diagram of dual-connectivity handover according to an embodiment of the disclosure.

First embodiment, referring to FIG. 2, a first schematic diagram of dual connectivity handover provided by an embodiment of the disclosure, in which a user terminal is in NR single connectivity with a source node (source gNB).

Step 201: the user terminal connects with the network through the source gNB (i.e. source node) and the source AMF, and the source gNB provides online play service for the user terminal.

Step 202: the source gNB sends handover request information carrying first information to the source AMF in order to handover the user terminal to the target master node. The first information is configuration information of the source node for the user terminal, or an index of configuration information of the source node for the user terminal.

For example, at a certain time point, the user terminal needs to establish a voice service, but the source gNB or its corresponding source AMF does not support the voice service. The source gNB sends handover request information carrying the first information to the source AMF in order to handover the user terminal to a target master node (such as a target eNB) supporting the voice service, and the target master node and the source node are located in different core networks, for example, the source node is located in a 5G system and the target master node is located in an LTE system.

Step 203: the source AMF sends a migration request carrying the first information to the target MME.

Since the source AMF and the target MME are located in different core networks, the source AMF is required to send a migration request to the target MME when handing over the user terminal to the target source node in the target MME.

Step 204: the target MME sends handover request information carrying the first information to the target eNB.

Step 205: the target eNB determines to configure the NE-DC (i.e. target dual connectivity) and generates the target master node configuration.

In order to maintain the service continuity for the user terminal, the target eNB determines to configure NE-DC (i.e. target dual connectivity) and selects at least one en-gNB as the target secondary node, denoted as SgNB. On the basis, the target eNB generates its configuration as the target master node, denoted as the master eNB (MeNB).

It should be noted that in the embodiment, the source gNB selected by the target eNB is exemplified as the target secondary node. After the source gNB is selected as the target secondary node, the source gNB is marked as the target en-gNB for ease of explanation, so the source gNB and the target en-gNB are shown by one node in FIG. 2. Of course, it is also possible that the target secondary node selected by the target master node is not the source gNB, in the case, the source gNB and the target en-gNB are not the same node.

Step 206: the target eNB sends a target secondary node addition request carrying first information to the target en-gNB.

Step 207: the target en-gNB generates target secondary node configuration according to the first information such that the target en-gNB uses the same configuration for the user terminal as the source gNB to improve service continuity of the user terminal.

When the first information is configuration information of the source node (source gNB) for the user terminal, the target en-gNB generates the target secondary node configuration directly according to the configuration information.

When the first information is the index of the configuration information, since the target en-gNB is located in the same physical entity (i.e., the same node) with the source gNB, the configuration information of the source node (source gNB) for the user terminal may be retrieved according to the index of the configuration information, and then the target secondary node configuration is generated according to the configuration information.

The index of the configuration information is the identifier of the user terminal at the source node, the identifier includes: a terminal identifier between the source node and the core network and applicable of the source node; or a C-RNTI; or a newly defined identifier, wherein the newly defined identifier is an identifier that the target secondary node is able to index the configuration information of the source node.

Step 208: the target en-gNB returns reply information for the target secondary node addition request to the target eNB. The reply information carries configuration information of the target en-gNB as the target secondary node.

Step 209: the target eNB returns reply information for the handover request information to the target MME. The reply information carries configuration information of the target dual connectivity.

Step 210: the target MME returns the response information for the migration request to the source AMF, and the response information carries the configuration information of the target dual connectivity.

Step 211: the source AMF sends a handover command to the source gNB, and the handover command carries the configuration information of the target dual connectivity.

Step 212: the source gNB sends RRC reconfiguration to the user terminal, and the RRC reconfiguration carries the configuration information of the target dual connectivity.

Step 213: the user terminal accesses the target radio access network corresponding to the target dual connectivity according to the RRC reconfiguration.

Figure 3:
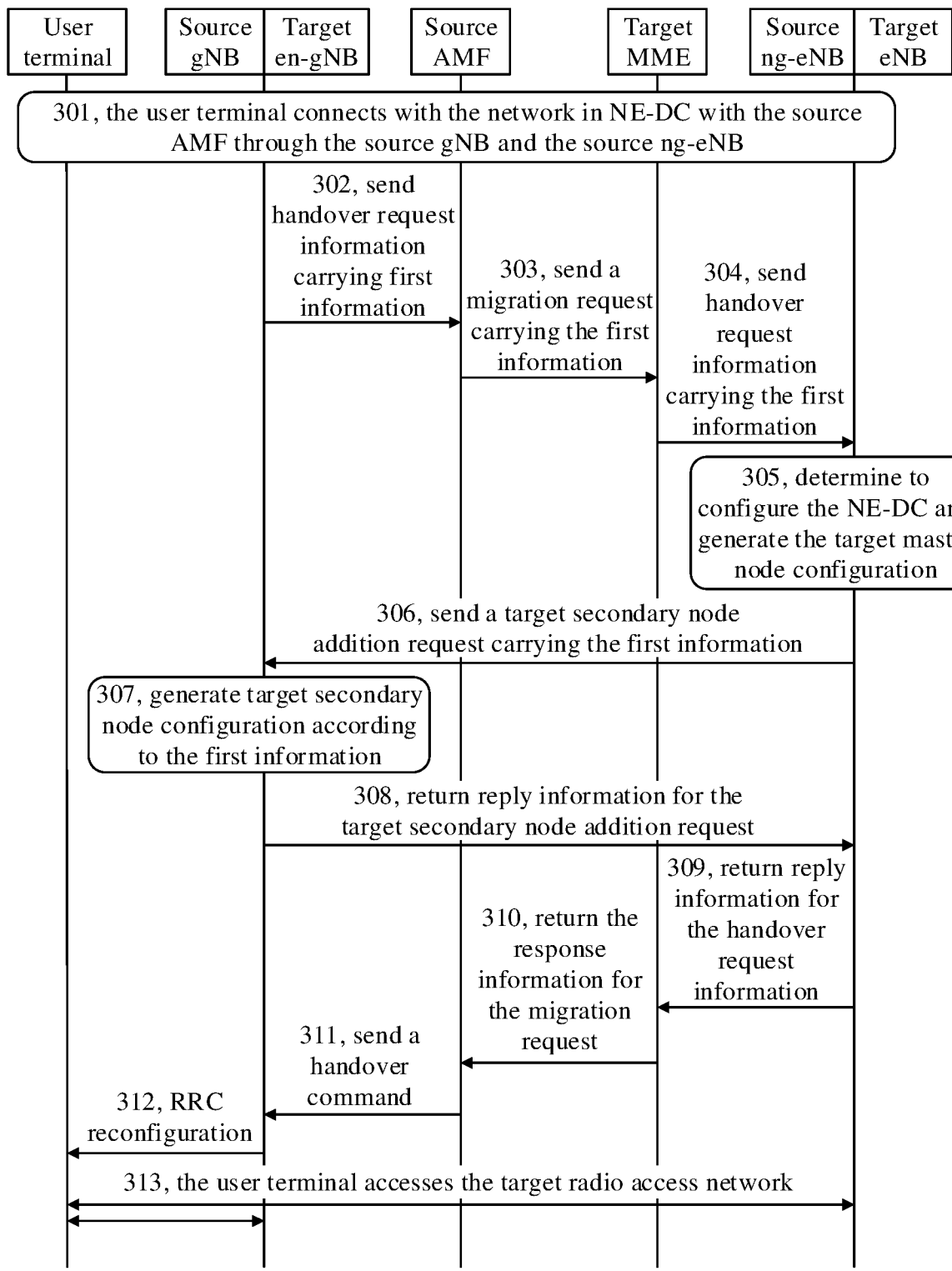
FIG. 3 is a second schematic diagram of dual-connectivity handover according to an embodiment of the disclosure.

Second embodiment, see FIG. 3, a second schematic diagram of dual connectivity handover provided by an embodiment of the disclosure, in which the user terminal is in NE-DC dual connectivity with the source node (source gNB), the source gNB is the master node in NE-DC dual connectivity, and the secondary node of the EN-DC dual connectivity is the source ng-eNB.

Step 301: the user terminal connects with the network in NE-DC source dual connectivity with the source AMF through the source gNB (i.e. source node) and the source ng-eNB, and the source gNB provides online play service for the user terminal.

In the embodiment, it is taken as an example that the source gNB and the source ng-eNB are located in different systems, such as the source gNB is located in the 5G system and the source ng-eNB is located in the LTE system.

Step 302: the source gNB sends handover request information carrying first information to the source AMF in order to handover the user terminal to the target master node. The first information is configuration information of the source node for the user terminal, or an index of configuration information of the source node for the user terminal.

For example, at a certain time point, the user terminal needs to establish a voice service, but the source gNB or its corresponding source AMF does not support the voice service, the source gNB sends handover request information carrying the first information to the source AMF in order to handover the user terminal to a target master node (such as the target eNB) supporting the voice service.

It should be noted that in the embodiment, in order to simplify the procedure, the source ng-eNB and the target eNB are illustrated as the same node, and in actual applications, the source ng-eNB and the target eNB may also be different nodes.

Step 303: the source AMF sends a migration request carrying the first information to the target MME.

Since the source AMF and the target MME are located in different core networks, the source AMF is required to send a migration request to the target MME when handing over the user terminal to the target source node in the target MME.

Step 304: the target MME sends handover request information carrying the first information to the target eNB.

Step 305: the target eNB determines to configure the EN-DC (i.e. target dual connectivity) and generates the target master node configuration.

In order to maintain the service continuity for the user terminal, the target eNB determines to configure EN-DC (i.e. target dual connectivity) and selects at least one en-gNB as the target secondary node, denoted as SgNB. On the basis, the target eNB generates its configuration as the target master node, denoted as MeNB.

It should be noted that in the embodiment, the source gNB selected by the target eNB is exemplified as the target secondary node. After the source gNB is selected as the target secondary node, the source gNB is marked as the target en-gNB for ease of explanation, so the source gNB and the target en-gNB are shown by one node in FIG. 3. Of course, it is also possible that the target secondary node selected by the target master node is not the source gNB, in the case, the source gNB and the target en-gNB are not the same node.

Step 306: the target eNB sends a target secondary node addition request carrying first information to the target en-gNB.

Step 307: the target en-gNB generates target secondary node configuration according to the first information such that the target en-gNB uses the same configuration for the user terminal as the source gNB to improve service continuity of the user terminal.

When the first information is configuration information of the source node (source gNB) for the user terminal, the target en-gNB generates the target secondary node configuration directly according to the configuration information.

When the first information is the index of the configuration information, since the target en-gNB is located in the same physical entity (i.e., the same node) with the source gNB, the configuration information of the source node (source gNB) for the user terminal may be retrieved according to the index of the configuration information, and then the target secondary node configuration is generated according to the configuration information.

The index of the configuration information is the identifier of the user terminal at the source node (source gNB), the identifier includes: a terminal identifier between the source node and the core network and applicable of the source node; or a C-RNTI; or a newly defined identifier, wherein the newly defined identifier is an identifier that the target secondary node is able to index the configuration information of the source node.

Step 308: the target en-gNB returns reply information for the target secondary node addition request to the target eNB. The reply information carries configuration information of the target en-gNB as the target secondary node.

Step 309: the target eNB returns reply information for the handover request information to the target MME. The reply information carries configuration information of the target dual connectivity.

Step 310: the target MME returns the response information for the migration request to the source AMF, and the response information carries the configuration information of the target dual connectivity.

Step 311: the source AMF sends a handover command to the source gNB, and the handover command carries the configuration information of the target dual connectivity.

Step 312: the source gNB sends RRC reconfiguration to the user terminal, and the RRC reconfiguration carries the configuration information of the target dual connectivity.

Step 313: the user terminal accesses the target radio access network corresponding to the target dual connectivity according to the RRC reconfiguration.

Figure 4:
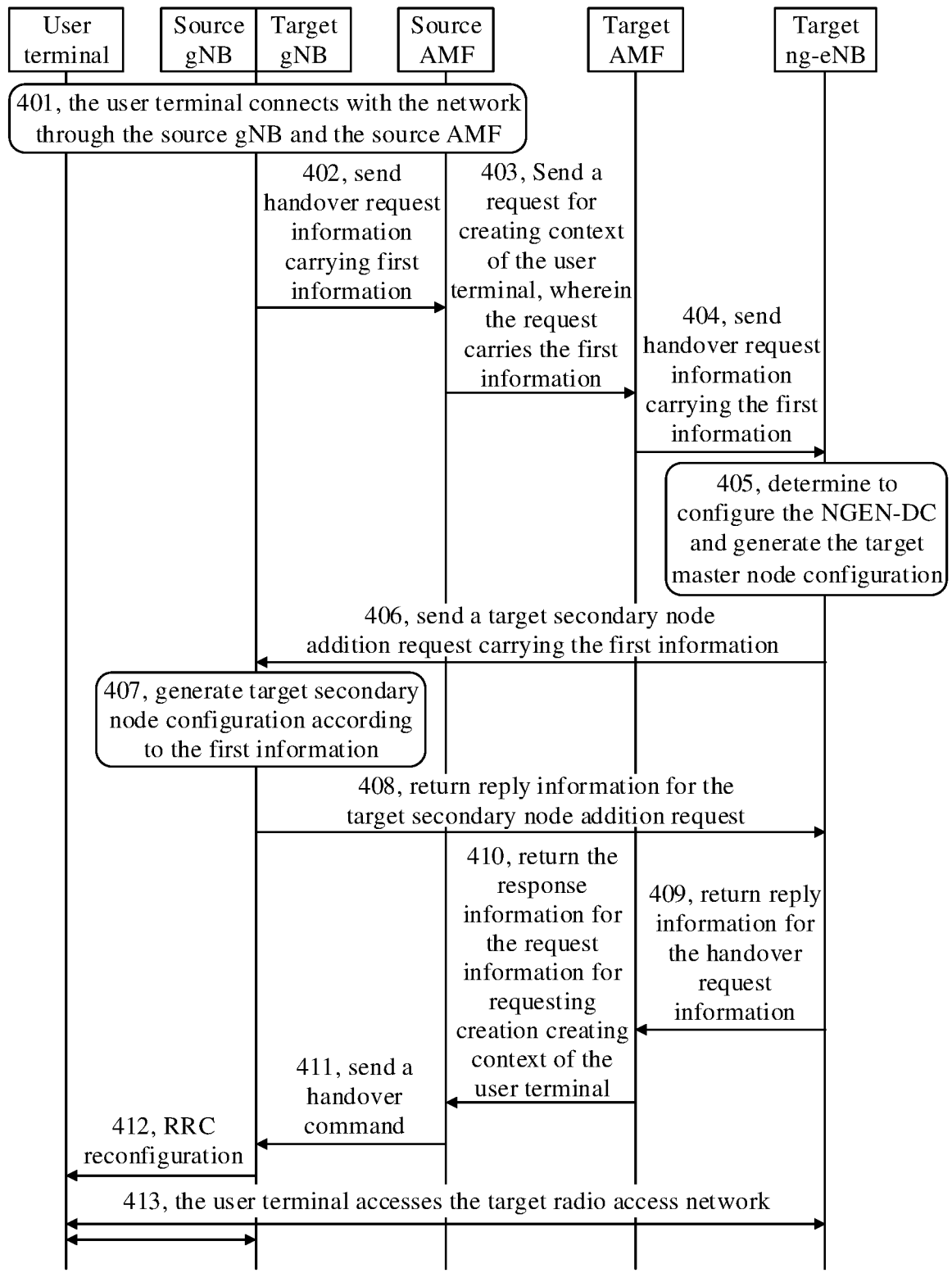
FIG. 4 is a third schematic diagram of dual-connectivity handover according to an embodiment of the disclosure.

Third embodiment, see FIG. 4, a third schematic diagram of dual connectivity handover provided by an embodiment of the disclosure, in which a user terminal is in NR single connectivity with a source node (source gNB).

Step 401: the user terminal connects with the network through the source gNB (i.e. source node) and the source AMF, and the source gNB provides online play service for the user terminal.

Step 402: the source gNB sends handover request information carrying first information to the source AMF in order to handover the user terminal to the target master node. The first information is configuration information of the source node for the user terminal, or an index of configuration information of the source node for the user terminal.

For example, at a certain time point, the user terminal needs to establish a voice service, but the source gNB or its corresponding source AMF does not support the voice service, the source gNB sends handover request information carrying the first information to the source AMF in order to handover the user terminal to a target master node (such as a target ng-eNB) supporting the voice service, and the target master node and the source node are located in the same core network, for example, both are located in a 5G system.

Step 403: the source AMF sends request information for creating context of the user terminal to the target AMF and the request information carries the first information.

Since the source AMF is located in the same core network as the target AMF, the source AMF is required to send the request information for creating context of the user terminal to the target AMF when handing over the user terminal to the target source node in the target AMF.

Step 404: the target AMF sends handover request information carrying the first information to the target ng-eNB.

Step 405: the target ng-eNB determines to configure the NGEN-DC (i.e. target dual connectivity) and generates the target master node configuration.

In order to maintain the service continuity for the user terminal, the target ng-eNB determines to configure NGEN-DC (i.e. target dual connectivity) and selects at least one gNB as the target secondary node, denoted as SgNB. On the basis, the target ng-eNB generates its configuration as the target master node, denoted as the MeNB.

It should be noted that in the embodiment, the source gNB selected by the target ng-eNB is exemplified as the target secondary node, after the source gNB is selected as the target secondary node, the source gNB is marked as the target gNB for ease of explanation, so the source gNB and the target gNB are shown by one node in FIG. 4. Of course, it is also possible that the target secondary node selected by the target master node is not the source gNB, in the case, the source gNB and the target gNB are not the same node.

Step 406: the target ng-eNB sends a target secondary node addition request carrying first information to the target gNB.

Step 407: the target gNB generates target secondary node configuration according to the first information such that the target gNB uses the same configuration for the user terminal as the source gNB to improve service continuity of the user terminal.

When the first information is configuration information of the source gNB for the user terminal, the target gNB generates the target secondary node configuration directly according to the configuration information.

When the first information is the index of the configuration information, since the target gNB is located in the same physical entity (i.e., the same node) with the source gNB, the configuration information of the source node (source gNB) for the user terminal may be retrieved according to the index of the configuration information, and then the target secondary node configuration is generated according to the configuration information.

The index of the configuration information is the identifier of the user terminal at the source node (source gNB), the identifier includes: a terminal identifier between the source node (source gNB) and the core network (source AMF) and applicable of the source node (source gNB); or a C-RNTI; or a newly defined identifier, wherein the newly defined identifier is an identifier that the target secondary node is able to index the configuration information of the source node.

Step 408: the target gNB returns reply information for the target secondary node addition request to the target ng-eNB. The reply information carries configuration information of the target gNB as the target secondary node.

Step 409: the target ng-eNB returns reply information for the handover request information to the target AMF. The reply information carries configuration information of the target dual connectivity.

Step 410: the target AMF returns the response information for the request information for requesting creation creating context of the user terminal to the source AMF and the response information carries the configuration information of the target dual connectivity.

Step 411: the source AMF sends a handover command to the source gNB, and the handover command carries the configuration information of the target dual connectivity.

Step 412: the source gNB sends RRC reconfiguration to the user terminal, and the RRC reconfiguration carries the configuration information of the target dual connectivity.

Step 413: the user terminal accesses the target radio access network corresponding to the target dual connectivity according to the RRC reconfiguration.

Figure 5:
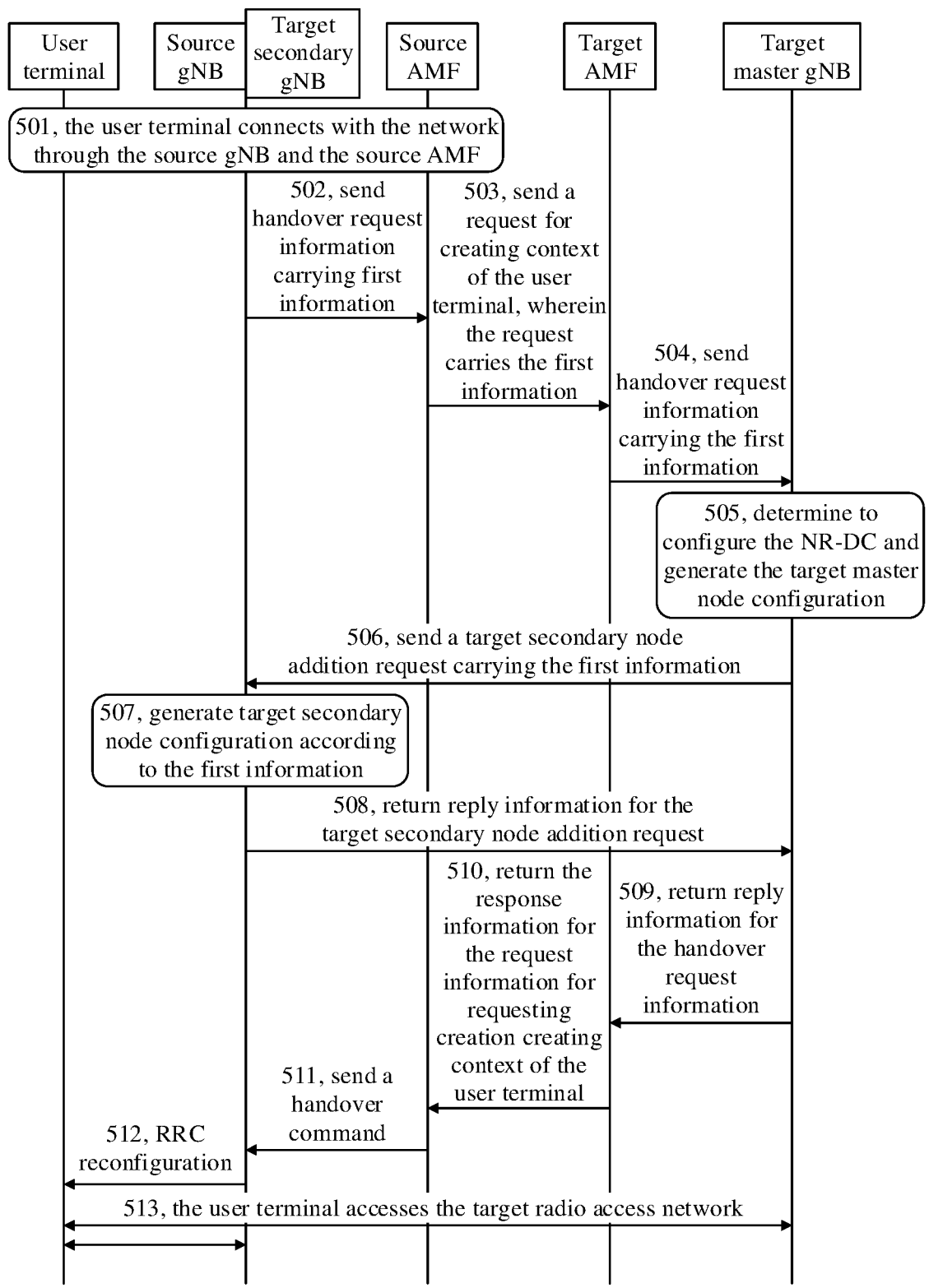
FIG. 5 is a fourth schematic diagram of dual-connectivity handover according to an embodiment of the disclosure.

Fourth embodiment, referring to FIG. 5, a fourth schematic diagram of dual connectivity handover provided by an embodiment of the disclosure, in which a user terminal is in NR single connectivity with a source node (source gNB).

Step 501: the user terminal connects with the network through the source gNB (i.e. source node) and the source AMF, and the source gNB provides online play service for the user terminal.

Step 502: the source gNB sends handover request information carrying first information to the source AMF in order to handover the user terminal to the target master node. The first information is configuration information of the source node for the user terminal, or an index of configuration information of the source node for the user terminal.

For example, at a certain time point, the user terminal needs to establish a voice service, but the source gNB does not support the voice service. The source gNB sends handover request information carrying the first information to the source AMF in order to handover the user terminal to a target master node (such as a target master gNB) supporting the voice service, for example, the source gNB is a high-frequency micro base station with unstable signals, which is not suitable for the voice service, so it does not support the voice service during network deployment. While the target master gNB is a low-frequency macro base station, which supports the voice service. The target master node and the source node are located in the same core network, such as the 5G system.

Step 503: the source AMF sends the request information for requesting creation creating context of the user terminal to the target AMF, and the request information carries the first information.

Since the source AMF is located in the same core network as the target AMF, the source AMF is required to send the request information for requesting creation creating context of the user terminal to the target AMF when handing over the user terminal to the target source node in the target AMF.

Step 504: the target AMF sends handover request information carrying the first information to the target master gNB.

Step 505: the target master gNB determines to configure the NR-DC (i.e. target dual connectivity) and generates target master node configuration.

In order to maintain the service continuity for the user terminal, the target master gNB determines to configure NR-DC (i.e. target dual connectivity) and selects at least one target gNB (usually a high-frequency micro base station) as the target secondary node, denoted as SgNB. On the basis, the target master gNB generates its configuration as the target master node, denoted as MgNB.

It should be noted that in the embodiment, the source gNB selected by the target master gNB is exemplified as the target secondary node. After the source gNB is selected as the target secondary node, the source gNB is marked as the target secondary gNB for ease of explanation, so the source gNB and the target secondary gNB are shown by one node in FIG. 5. Of course, it is also possible that the target secondary node selected by the target master node is not the source gNB, in the case, the source gNB and the target master gNB are not the same node.

Step 506: the target master gNB sends a target secondary node addition request carrying first information to the target secondary gNB.

Step 507: the target secondary gNB generates target secondary node configuration according to the first information such that the target secondary gNB uses the same configuration for the user terminal as the source gNB to improve service continuity of the user terminal.

When the first information is configuration information of the source node (source gNB) for the user terminal, the target secondary gNB generates the target secondary node configuration directly according to the configuration information.

When the first information is the index of the configuration information, since the target secondary gNB is located in the same physical entity (i.e., the same node) with the source gNB, the configuration information of the source node (source gNB) for the user terminal may be retrieved according to the index of the configuration information, and then the target secondary node configuration is generated according to the configuration information.

The index of the configuration information is the identifier of the user terminal at the source node (source gNB), the identifier includes: a terminal identifier between the source node (source gNB) and the core network (source AMF) and applicable of the source node; or a C-RNTI; or a newly defined identifier, wherein the newly defined identifier is an identifier that the target secondary node (target secondary gNB) is able to index the configuration information of the source node.

Step 508: the target secondary gNB returns reply information for the target secondary node addition request to the target master gNB. The reply information carries configuration information of the target secondary gNB as the target secondary node.

Step 509: the target master gNB returns reply information for the handover request information to the target AMF. The reply information carries configuration information of the target dual connectivity.

Step 510: the target AMF returns the response information for the request information for requesting creation creating context of the user terminal to the source AMF, and the response information carries the configuration information of the target dual connectivity.

Step 511: the source AMF sends a handover command to the source gNB, and the handover command carries the configuration information of the target dual connectivity.

Step 512: the source gNB sends RRC reconfiguration to the user terminal, and the RRC reconfiguration carries the configuration information of the target dual connectivity.

Step 513: the user terminal accesses the target radio access network corresponding to the target dual connectivity according to the RRC reconfiguration.

Figure 6:
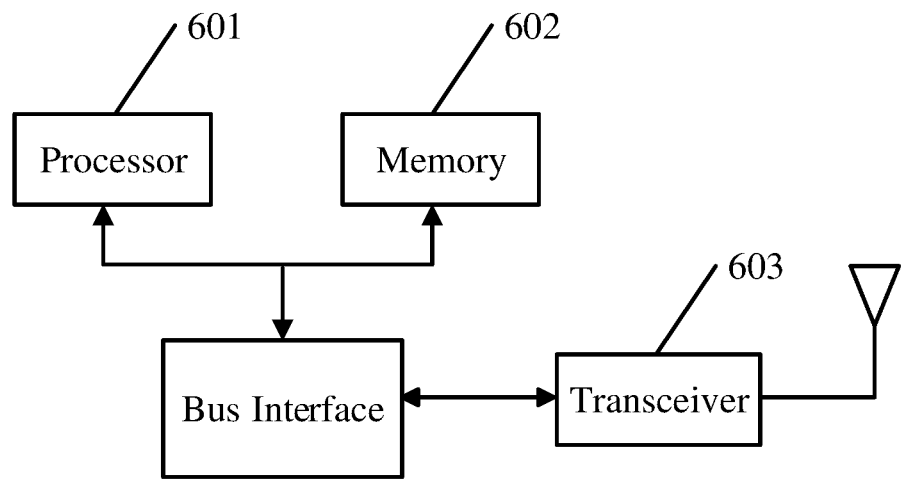
FIG. 6 is a first schematic diagram of a dual-connectivity handover device of the target master node according to an embodiment of the disclosure.

As shown in FIG. 6, an embodiment of the disclosure provides a dual-connectivity handover device, performed by a target master node of target dual connectivity, wherein the target dual connectivity further includes a target secondary node, and a user terminal communicates with a source node before accessing the target dual connectivity. The handover device includes: a processor 601, a memory 602 and a transceiver 603.

The processor 601 is configured to read the program in the memory to: receive handover request information; wherein the handover request information at least carries first information, and the first information is configuration information of the source node for the user terminal, or an index of configuration information of the source node for the user terminal; and send a first interface message to the target secondary node, wherein the first interface message carries the first information for enabling the target secondary node to configure the user terminal according to the first information.

Optionally, the index of the configuration information is an identifier of the user terminal at the source node.

Optionally, the identifier includes: a terminal identifier between the source node and a core network and applicable of the source node; or a C-RNTI; or a newly defined identifier, wherein the newly defined identifier is an identifier that the target secondary node is able to index the configuration information of the source node.

Optionally, the source node is a single connectivity node or a master node in source dual connectivity.

The processor 601 is responsible for managing the bus architecture and general processing, and the memory 602 may store data used by the processor when performing operations. The transceiver 603 is configured to receive and transmit data under control of the processor.

The bus architecture may include any number of interconnected buses and bridges, specifically one or more processors represented by the processor 601 and various circuits of a memory represented by the memory 602 are linked together. The bus architecture may also link various other circuits such as peripheral devices, voltage regulators, power management circuits, etc., which are well known in the art, so they will not be further described here. A bus interface provides an interface. The processor 601 is responsible for managing the bus architecture and general processing, and the memory 602 may store data used by the processor when performing operations.

The processes disclosed in the embodiments of the disclosure may be performed by or implemented by the processor 601. In implementation, each step of the signal processing flow may be completed by the integrated logic circuit of hardware or instructions in the form of software in the processor 601. The processor 601 may be a general-purpose processor, a digital signal processor, an application specific integrated circuit, a field programmable gate array or other programmable logic devices, discrete gate or transistor logic devices, and discrete hardware components, and may implement or execute the public methods, steps, and logical block diagrams in the embodiments of the disclosure. A general-purpose processor may be a microprocessor or any conventional processor. The steps of the method disclosed in combination with the embodiments of the disclosure may be directly embodied in the execution completion of the hardware processor, or the combination of hardware and software modules in the processor 601. The software module may be located in a RAM, a flash memory, a read-only memory, a programmable read-only memory or an electrically erasable programmable memory, a register and other storage media mature in the art. The storage medium is located in the memory 602, and the processor reads the information in the memory and completes the steps of the signal processing flow in combination with its hardware.

Figure 7:
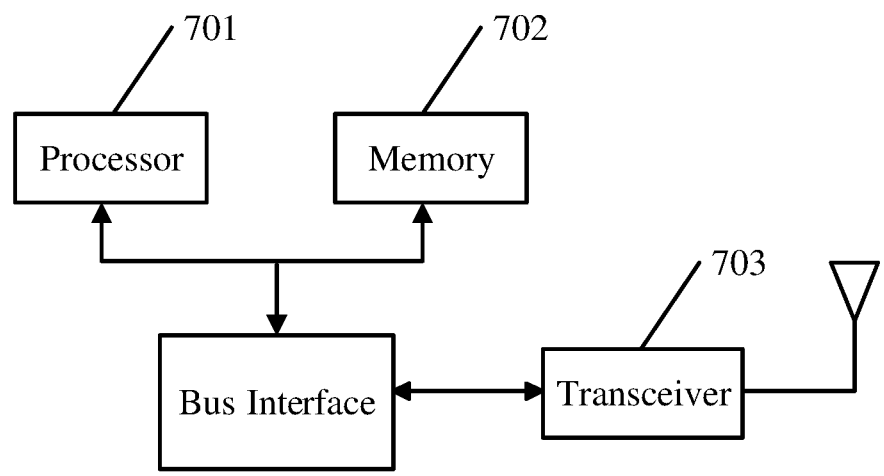
FIG. 7 is a schematic diagram of the dual-connectivity handover device of a target secondary node according to an embodiment of the disclosure.

As shown in FIG. 7, an embodiment of the disclosure provides a dual-connectivity handover device, performed by a target secondary node of target dual connectivity, wherein the target dual connectivity further includes a target master node, and a user terminal communicates with a source node before accessing the target dual connectivity. The handover device includes: a processor 701, a memory 702, and a transceiver 703.

The processor 701 is configured to read the program in the memory 702 to receive a first interface message sent by the target master node.

The first interface message carries the first information for enabling the target secondary node to configure the user terminal according to the first information, and the first information is configuration information of the source node for the user terminal, or an index of configuration information of the source node for the user terminal.

Optionally, the index of the configuration information is an identifier of the user terminal at the source node.

Optionally, the identifier includes: a terminal identifier between the source node and a core network and applicable of the source node; or a C-RNTI; or a newly defined identifier, wherein the newly defined identifier is an identifier that the target secondary node is able to index the configuration information of the source node.

Optionally, the source node is a single connectivity node or a master node in source dual connectivity.

The processor 701 is responsible for managing the bus architecture and general processing, and the memory 702 may store data used by the processor when performing operations. The transceiver 703 is configured to receive and transmit data under control of the processor.

The bus architecture may include any number of interconnected buses and bridges, specifically one or more processors represented by the processor 701 and various circuits of a memory represented by the memory are linked together. The bus architecture may also link various other circuits such as peripheral devices, voltage regulators, power management circuits, etc., which are well known in the art, so they will not be further described here. A bus interface provides an interface. The processor 701 is responsible for managing the bus architecture and general processing, and the memory 702 may store data used by the processor when performing operations.

The processes disclosed in the embodiments of the disclosure may be performed by or implemented by the processor 701. In implementation, each step of the signal processing flow may be completed by the integrated logic circuit of hardware or instructions in the form of software in the processor. The processor 701 may be a general-purpose processor, a digital signal processor, an application specific integrated circuit, a field programmable gate array or other programmable logic devices, discrete gate or transistor logic devices, and discrete hardware components, and may implement or execute the public methods, steps, and logical block diagrams in the embodiments of the disclosure. A general-purpose processor may be a microprocessor or any conventional processor. The steps of the method disclosed in combination with the embodiments of the disclosure may be directly embodied in the execution completion of the hardware processor, or the combination of hardware and software modules in the processor 701. The software module may be located in a RAM, a flash memory, a read-only memory, a programmable read-only memory or an electrically erasable programmable memory, a register and other storage media mature in the art. The storage medium is located in the memory 702, and the processor 701 reads the information in the memory and completes the steps of the signal processing flow in combination with its hardware.

Figure 8:
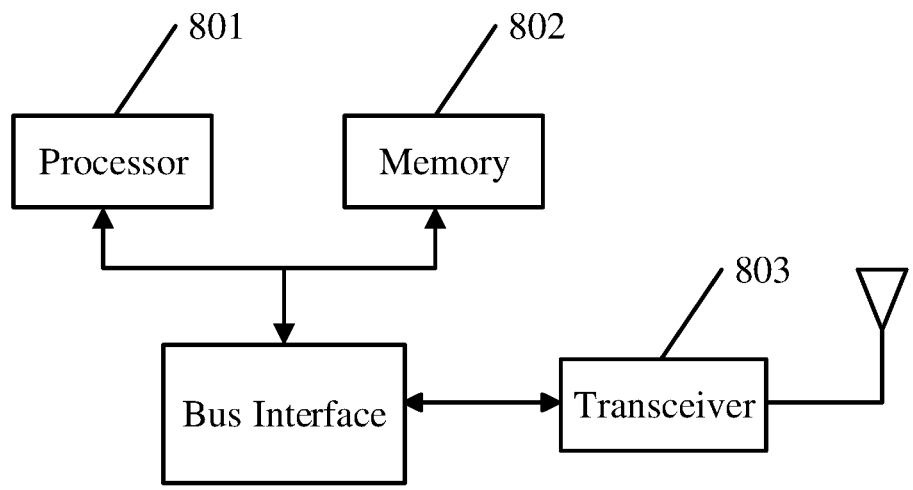
FIG. 8 is a schematic diagram of the dual-connectivity handover device of a source node according to an embodiment of the disclosure.

As shown in FIG. 8, an embodiment of the disclosure provides a dual-connectivity handover device in a source node, and the source node is connected with a user terminal. The handover device includes: a processor 801, a memory 802 and a transceiver 803.

The processor 801 is configured to read the program in the memory 802 to send handover request information to a core network.

The handover request information is configured to request to handover the user terminal to a target master node, so as to enable the target master node, upon determining that target dual connectivity is configured for the user terminal, to send a first interface message to a target secondary node of the target dual connectivity; the handover request information at least carries first information; and the first interface message carries the first information for enabling the target secondary node to configure the user terminal according to the first information, the first information is configuration information of the source node for the user terminal, or an index of configuration information of the source node for the user terminal.

Optionally, the index of the configuration information is an identifier of the user terminal at the source node.

Optionally, the identifier includes: a terminal identifier between the source node and a core network and applicable of the source node; or a C-RNTI; or a newly defined identifier, wherein the newly defined identifier is an identifier that the target secondary node is able to index the configuration information of the source node.

Optionally, the source node is a single connectivity node or a master node in source dual connectivity.

The processor 801 is responsible for managing the bus architecture and general processing, and the memory 802 may store data that is used by the processor 801 in performing operations. The transceiver 803 is configured to receive and transmit data under control of the processor 801.

The bus architecture may include any number of interconnected buses and bridges, specifically one or more processors represented by the processor 801 and various circuits of a memory represented by the memory are linked together. The bus architecture may also link various other circuits such as peripheral devices, voltage regulators, power management circuits, etc., which are well known in the art, so they will not be further described here. A bus interface provides an interface. The processor 801 is responsible for managing the bus architecture and general processing, and the memory 802 may store data used by the processor 801 in performing operations.

The processes disclosed in the embodiments of the disclosure may be performed by or implemented by the processor 801. In implementation, each step of the signal processing flow may be completed by the integrated logic circuit of hardware or instructions in the form of software in the processor 801. The processor 801 may be a general-purpose processor, a digital signal processor, an application specific integrated circuit, a field programmable gate array or other programmable logic devices, discrete gate or transistor logic devices, and discrete hardware components, and may implement or execute the public methods, steps, and logical block diagrams in the embodiments of the disclosure. A general-purpose processor may be a microprocessor or any conventional processor. The steps of the method disclosed in combination with the embodiments of the disclosure may be directly embodied in the execution completion of the hardware processor, or the combination of hardware and software modules in the processor. The software module may be located in a RAM, a flash memory, a read-only memory, a programmable read-only memory or an electrically erasable programmable memory, a register and other storage media mature in the art. The storage medium is located in the memory 802, and the processor 801 reads the information in the memory 802 and completes the steps of the signal processing flow in combination with its hardware.

Figure 9:
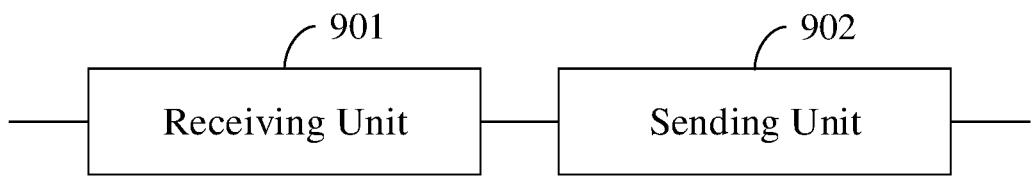
FIG. 9 is a second schematic diagram of the dual-connectivity handover device of the target master node according to an embodiment of the disclosure.

Based on the same inventive concept, a dual-connectivity handover device is provided in an embodiment of the disclosure and is in a target master node of target dual connectivity. The target dual connectivity further includes a target secondary node, and a user terminal communicates with a source node before accessing the target dual connectivity. A detailed implementation mode of the handover method of the handover device may refer to the description in the method of the embodiment on the target master node, and the repetition will not be repeated. Please refer to FIG. 9, the handover device includes a receiving unit 901 and a sending unit 902.

The receiving unit 901 is configured to receive handover request information; wherein the handover request information at least carries first information, and the first information is configuration information of the source node for the user terminal, or an index of configuration information of the source node for the user terminal.

The sending unit 902 is configured to send a first interface message to the target secondary node, wherein the first interface message carries the first information for enabling the target secondary node to configure the user terminal according to the first information.

Optionally, the index of the configuration information is an identifier of the user terminal at the source node.

Optionally, the identifier includes: a terminal identifier between the source node and a core network and applicable of the source node; or a C-RNTI; or a newly defined identifier, wherein the newly defined identifier is an identifier that the target secondary node is able to index the configuration information of the source node.

Optionally, the source node is a single connectivity node or a master node in source dual connectivity.

Based on the same inventive concept, a dual-connectivity handover device is provided in an embodiment of the disclosure and is in a target secondary node of target dual connectivity. The target dual connectivity further includes a target master node, and a user terminal communicates with a source node before accessing the target dual connectivity. A detailed implementation mode of the handover method of the handover device may refer to the description of the method embodiment on the target secondary node, and the repetition will not be repeated. The handover device includes a receiving unit.

The receiving unit is configured to receive a first interface message sent by the target master node. The first interface message carries first information for enabling the target secondary node to configure the user terminal according to the first information, and the first information is configuration information of the source node for the user terminal, or an index of configuration information of the source node for the user terminal.

Optionally, the index of the configuration information is an identifier of the user terminal at the source node.

Optionally, the identifier includes: a terminal identifier between the source node and a core network and applicable of the source node; or a C-RNTI; or a newly defined identifier, wherein the newly defined identifier is an identifier that the target secondary node is able to index the configuration information of the source node.

Optionally, the source node is a single connectivity node or a master node in source dual connectivity.

Based on the same inventive concept, in an embodiment of the disclosure a dual-connectivity handover device is provided, the device is in a source node. The source node is connected with a user terminal. A detailed implementation mode of the handover method of the handover device may refer to the description of the method embodiment performed by the source node, and the repetition will not be repeated. The handover device includes a sending unit, configured to send handover request information to a core network. The handover request information is configured to request to handover the user terminal to a target master node, so as to enable the target master node, upon determining that target dual connectivity is configured for the user terminal, to send a first interface message to a target secondary node of the target dual connectivity; the handover request information at least carries first information; and the first interface message carries the first information for enabling the target secondary node to configure the user terminal according to the first information, and the first information is configuration information of the source node for the user terminal, or an index of configuration information of the source node for the user terminal.

Optionally, the index of the configuration information is an identifier of the user terminal at the source node.

Optionally, the identifier includes: a terminal identifier between the source node and a core network and applicable of the source node; or a C-RNTI; or a newly defined identifier, wherein the newly defined identifier is an identifier that the target secondary node is able to index the configuration information of the source node.

Optionally, the source node is a single connectivity node or a master node in source dual connectivity.

Based on the same inventive concept, an embodiment of the disclosure also provides a processor-readable storage medium which includes the processor-readable storage medium stores a program which, when run on a processor, causes the processor to execute the dual-connectivity handover method on the target master node, or target secondary node, or source node as described above.

Those skilled in the art should understand that the embodiments of the disclosure may be provided as methods, systems, or computer program products. Therefore, the embodiments of the disclosure may take the form of full hardware embodiments, full software embodiments, or embodiments combining software and hardware aspects. Moreover, the embodiments of the disclosure may take the form of computer program products implemented on one or more computer usable storage media (including but not limited to the disk memory, CD-ROM, optical memory, etc.) containing computer usable program codes.

The embodiment of the disclosure is described with reference to the flow chart and/or block diagram of the method, device (system), and computer program product according to the embodiment of the disclosure. It should be understood that each process and/or block in the flow chart and/or block diagram and the combination of processes and/or blocks in the flow chart and/or block diagram may be realized by computer program instructions. These computer program instructions may be provided for the processors of general-purpose computers, special-purpose computers, embedded processors, or other programmable data processing devices to generate a machine, so that instructions executed by the processors of computers or other programmable data processing devices generate apparatuses for realizing the functions specified in one or more processes of the flowchart and/or one or more blocks of the block diagram.

These computer program instructions may also be stored in a computer-readable memory that may guide a computer or other programmable data processing devices to work in a specific way, so that the instructions stored in the computer-readable memory produce a manufacturing product including an instruction device that implements the functions specified in one or more flows of the flowchart and/or one or more blocks of the block diagram.

These computer program instructions may also be loaded onto a computer or other programmable data processing devices so that a series of operation steps are performed on the computer or other programmable devices to produce computer implemented processing, so that the instructions executed on the computer or other programmable devices provide steps for realizing the functions specified in one or more processes of the flowchart and/or one or more blocks of the block diagram.

Obviously, those skilled in the art may make various changes and modifications to the disclosure without departing from the spirit and scope of the disclosure. Thus, if these modifications and variations of the disclosure fall within the scope of the claims of the disclosure and its equivalent technology, the disclosure is also intended to include these modifications and variations.

What is claimed is:

1. A dual-connectivity handover method, performed by a target master node of target dual connectivity, wherein the target dual connectivity further comprises a target secondary node, a user terminal communicates with a source node before accessing the target dual connectivity, and the method comprises:
receiving handover request information, wherein the handover request information carries first information, and the first information is an index of configuration information of the source node for the user terminal; wherein the configuration information of the source node for the user terminal is retrieved according to the index of the configuration information, the index of the configuration information is an identifier of the user terminal at the source node, and the identifier comprises a terminal identifier between the source node and a core network and applicable of the source node; and
sending a first interface message to the target secondary node, wherein the first interface message carries the first information for enabling the target secondary node to configure the user terminal according to the first information.

2. The handover method according to claim 1, wherein the identifier further comprises:
a newly defined identifier, wherein the newly defined identifier is an identifier that the target secondary node is able to index the configuration information of the source node.

3. The handover method according to claim 1, wherein the source node is a single connectivity node or a master node in source dual connectivity.

4. A dual-connectivity handover device, performed by a target master node of target dual connectivity, wherein the target dual connectivity further comprises a target secondary node, a user terminal communicates with a source node before accessing the target dual connectivity, and the handover device comprises: a processor, a memory, and a transceiver;
wherein the processor is configured to read the program in the memory and perform the method according to claim 1.

5. The handover device according to claim 4, wherein the identifier further comprises:
a newly defined identifier, wherein the newly defined identifier is an identifier that the target secondary node is able to index the configuration information of the source node.

6. The handover device according to claim 4, wherein the source node is a single connectivity node or a master node in source dual connectivity.

7. A dual-connectivity handover method, performed by a target secondary node of target dual connectivity, wherein the target dual connectivity further comprises a target master node, a user terminal communicates with a source node before accessing the target dual connectivity, and the method comprises:
receiving a first interface message sent by the target master node;
wherein the first interface message carries first information for enabling the target secondary node to configure the user terminal according to the first information, and the first information is an index of configuration information of the source node for the user terminal; wherein the configuration information of the source node for the user terminal is retrieved according to the index of the configuration information, the index of the configuration information is an identifier of the user terminal at the source node, and the identifier comprises a terminal identifier between the source node and a core network and applicable of the source node.

8. The handover method according to claim 7, wherein the identifier further comprises:
a newly defined identifier, wherein the newly defined identifier is an identifier that the target secondary node is able to index the configuration information of the source node.

9. The handover method according to claim 7, wherein the source node is a single connectivity node or a master node in source dual connectivity.

10. A dual-connectivity handover device, performed by a target secondary node of target dual connectivity, wherein the target dual connectivity further comprises a target master node, a user terminal communicates with a source node before accessing the target dual connectivity, and the handover device comprises: a processor, a memory, and a transceiver;
wherein the processor is configured to read the program in the memory and perform the method according to claim 7.

11. The handover device according to claim 10, wherein the identifier further comprises:

a newly defined identifier, wherein the newly defined identifier is an identifier that the target secondary node is able to index the configuration information of the source node.

12. The handover device according to claim 10, wherein the source node is a single connectivity node or a master node in source dual connectivity.

13. A dual-connectivity handover method, performed by a source node, wherein the source node is connected with a user terminal, and the method comprises:

sending handover request information to a core network;

wherein the handover request information is configured to request to handover the user terminal to a target master node, so as to enable the target master node, upon determining that target dual connectivity is configured for the user terminal, to send a first interface message to a target secondary node of the target dual connectivity; the handover request information carries first information; and the first interface message carries the first information for enabling the target secondary node to configure the user terminal according to the first information, and the first information is an index of configuration information of the source node for the user terminal; wherein the configuration information of the source node for the user terminal is retrieved according to the index of the configuration information, index of the configuration information is an identifier of the user terminal at the source node, and the identifier comprises a terminal identifier between the source node and a core network and applicable of the source node.

14. The handover method according to claim 13, wherein the identifier further comprises:

a newly defined identifier, wherein the newly defined identifier is an identifier that the target secondary node is able to index the configuration information of the source node.

15. The handover method according to claim 13, wherein the source node is a single connectivity node or a master node in source dual connectivity.

16. A dual-connectivity handover device, performed by a source node, wherein the source node is connected with a user terminal, and the handover device comprises: a processor, a memory, and a transceiver;

wherein the processor is configured to read the program in the memory and perform the method according to claim 9.

17. The handover device according to claim 16, wherein the identifier further comprises:

a newly defined identifier, wherein the newly defined identifier is an identifier that the target secondary node is able to index the configuration information of the source node.

18. The handover device according to claim 16, wherein the source node is a single connectivity node or a master node in source dual connectivity.

* * * * *